Feb. 9, 1965
G. M. REID
3,168,852
APPARATUS FOR USE IN MAKING AN ARTICLE FROM A BLOCK OF MATERIAL
Filed Oct. 4, 1963
2 Sheets-Sheet 1
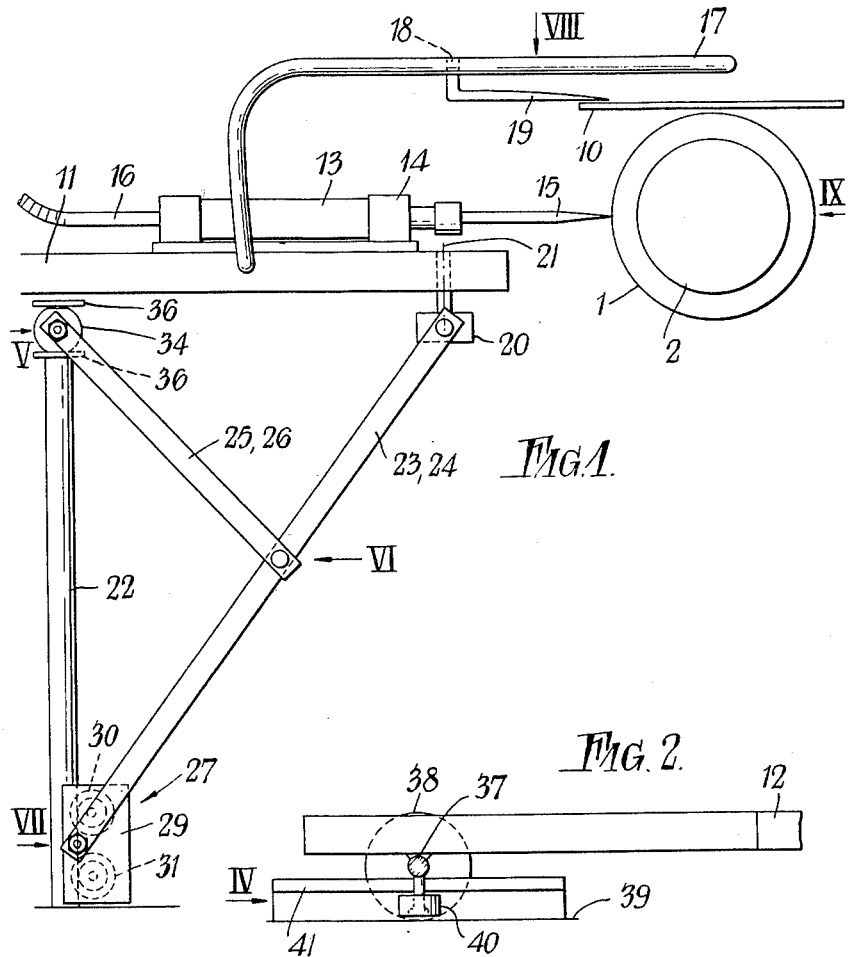
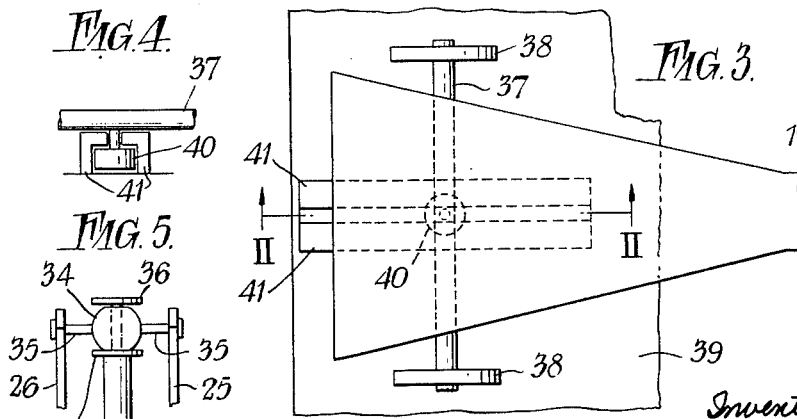
Inventor:
George Macdonald Reid
BY Baldwin & Wight
Attorneys Feb. 9, 1965
G. M. REID
3,168,852
APPARATUS FOR USE IN MAKING AN ARTICLE
FROM A BLOCK OF MATERIAL
Filed Oct. 4, 1963
2 Sheets—Sheet 2
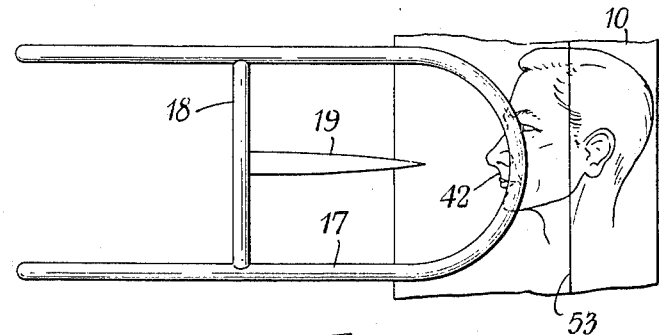
FIG. 8.
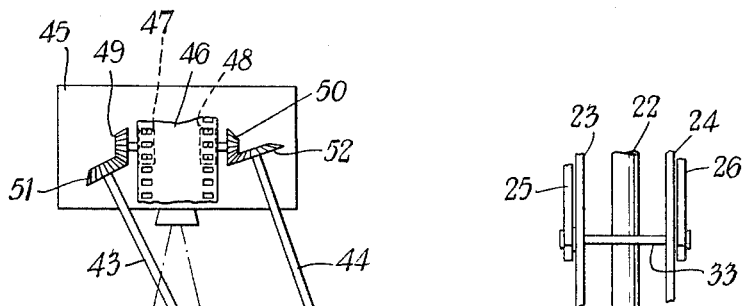
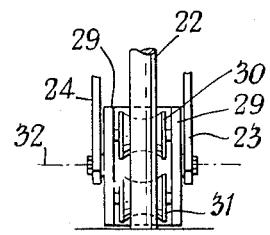
FIG. 6.
FIG. 7.
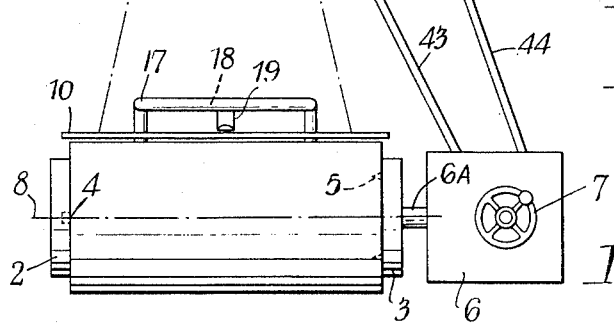
FIG. 9.
Inventor:
George Macdonald Reid
By Baldwin & Wight
Attorneys

United States Patent Office 3,168,852
Patented Feb. 9, 1965

3,168,852
APPARATUS FOR USE IN MAKING AN ARTICLE FROM A BLOCK OF MATERIAL
George Macdonald Reid, Aldford House, Park St., London W.1, England
Filed Oct. 4, 1963, Ser. No. 314,049
8 Claims. (Cl. 90—13.1)

This invention relates to an apparatus for use in making an article from a block of material.

According to the invention there is provided apparatus for use in making an article from a block of material, comprising a rotatably mounted support device for supporting a block of material such that the block and the support device may be turned about an axis of rotation, a long carriage adjacent the support device having one end nearer the support device than the other end, a tool holder rotatably mounted at said one end of the carriage for holding a rod-shaped tool directed towards said axis, means coupled to the tool holder for rotating the tool holder about its own axis, a fixed structure adjacent said other end of the carriage and a pivotal connection between the fixed structure and said other end of the carriage such that the pivot axis is movable along a straight path towards and away from said axis of rotation and this permits the tool holder to be moved adjacent the support device in all the directions which are such that the axis of the tool holder is always maintained in the same plane, which is a plane containing said rotational axis.

The apparatus can be used for copying a three-dimensional object, that is to say producing from a block of material, for example plaster, a three-dimensional replica of an object to be copied. The object may be a person's head. This use of the apparatus may involve cutting the block in a plurality of planes which contain the axis of the block, the shapes cut in the different planes corresponding to the profile of the object as seen from different angles. The profiles may be obtained by photography or by forming shadows of the object.

For a better understanding of the invention and to show how the same may be carried into effect, reference will now be made to the accompanying drawings in which:

FIGURE 1 is a side view of part of an apparatus for use in making an article from a cylindrical block of material, FIGURE 2 is a corresponding side view of another part of the apparatus, as seen from the line in FIGURE 3 with the arrows marked II—II, FIGURE 3 is a plan view of the part shown in FIGURE 2, FIGURE 4 is a fragmentary end view of that part, seen as indicated by the arrow IV in FIGURE 2, FIGURES 5 to 8 are fragmentary views of the apparatus, seen as indicated by the arrows V, VI, VII and VIII in FIGURE 1, and FIGURE 9 is a view, in elevation, of a further part of the apparatus.

Referring first to FIGURES 1 and 9, a cylindrical block 1 of plaster is mounted horizontally between and co-axial with, two circular plates 2 and 3. The block is formed with a metal pin 4 cast centrally into one end of it and this pin fits into a central recess in the plate 2. The plate 3 is formed with several tooth-like projections 5 which project into the block 1 so that when the plate 3 is turned the block will turn with it. Means (not shown) are provided for displacing the plate 2 to left and right so that the block 1 may be removed and replaced by another. The plate 3 is coupled by a shaft 6A to a diagrammatically illustrated driving mechanism 6 which, when operated by a handwheel 7, turns the block 1 about its axis, 8, which is also the axis of the means for holding and turning the block. A board 10 is supported in a horizontal plane above the block 1, by means not shown.

A long carriage is provided near the block, one end, 11, of it being shown in FIGURE 1 and the other end, 12, being shown in FIGURES 2 and 3. On the end 11 is a bearing housing 13 from which projects a tool-holder 14 which receives a rod-shaped cutting tool 15. The axis of the tool-holder lies in a plane containing the axis of the block. The tool 15 has a sharply pointed tip and it is rotated by means of a flexible driving shaft in a flexible conduit 16, the shaft and the conduit being led from an electric motor (not shown) which stands on the ground near the end 12 of the carriage. There is also connected to the end 11 of the carriage an operating handle 17 consisting of a bent length of tubing fastened at its two ends to opposite sides of the carriage. A bar 18 secured to the handle 17 carries a pointer 19 the tip of which is close to the upper surface of the board 10 and vertically above the tip of the tool 15.

A member 20 is disposed beneath the end 11 of the carriage and is pivotally connected to it, the pivot axis being vertical and represented by the line 21. A fixed vertical post 22, of circular cross-section, is disposed beneath the carriage. A support structure for the end 11 of the carriage is mounted to swing about the post 22 and has a pivotal connection to the member 20, the pivot axis being horizontal. The support structure consists of two equal and parallel inclined bars 23 and 24, each of which has at its upper end the aforementioned pivotal connection to the member 20, two equal and parallel inclined bars 25 and 26, a rider 27, which rides up and down the post 22 and turns about it, and an element which turns about the upper end of the post 22 but is not movable axially with respect to it. The rider 27 consists of a vertical trough-shaped member 29 between the two arms of which there extend two pins upon which are mounted respective wheels 30 and 31 which have concave peripheral surfaces that engage the post 22. This is best seen in FIGURE 7. The lower ends of the bars 23 and 24 are pivotally connected to the outside of the member 29, the pivot axis being horizontal and represented by the line 32. The lower ends of the arms 25 and 26 are articulated, by means of a horizontal pivot pin 33, to the arms 23 and 24 at the centre of the latter, as can be seen in FIGURE 6. The upper ends of the arms 25 and 26 are pivotally connected to an oblate spherical element 34 having horizontal pivot pins 35, for this pivotal connection, projecting transversely from it. The element 34 has passing freely through it a reduced upper portion of the post 22, so that the element can turn about the axis of the post. The element is prevented from moving vertically with respect to the post 22, except by a small amount, by flanges 36 fixed to the post 22 above and below the element 34.

The other end 12 of the carriage gradually widens and underneath it is fixed an axle 37 with a wheel 38 mounted on each end. The wheels rest on a flat, horizontal surface 39 of a fixed structure and they support the weight of the end 12 of the carriage. Between the wheels there is a screw 40 with its head lowermost and with its shank screwed into the axle 37. The head of the screw is disposed between two guide rails 41, as can be seen from FIGURES 3 and 4, which extend towards and away from the centre of the block 1. The screw affords a slidable, pivotal connection between the carriage and the fixed structure.

If a photograph or a shadow of a three-dimensional article to be copied is optically projected onto the board 10, as represented by 42 in FIGURE 8, or if a photograph is physically placed upon the board 10, the profile of the article so obtained on the board may be traced by the tip of the pointer 19, the operator manually moving the handle 17 so that the pointer, which is secured to the handle, follows the contours of the profile. It will be appreciated that when this happens the tip of the tool 15 moves in exactly the same manner as the tip of the pointer and, since the tool is rotated at high speed, it cuts in the horizontal plane in the block a profile corresponding to that of the photograph or shadow.

When the tool and the pointer are moved as described above the carriage slides towards and away from the block 1 so that the axis of the pivotal connections between the end 12 of the carriage and the fixed structure (i.e. the axis of the screw 40) is displaced correspondingly.

When the carriage is moved towards the block, the bars 23 to 26 take up new positions, inclined to the horizontal by a smaller angle than before, and the rider 29 rides up the post 22, this being accompanied by turning of the wheels 31. Movement of the bars 23 to 26 and the rider 29 in the reverse sense is stopped when the rider strikes an abutment such as the ground, as illustrated. Also, the carriage turns through small angles about the screw 40, this being accompanied by swinging movements of the support structure, at the other end of the carriage, about the post 22. Thus the parts 20, 23 to 26, 27 and 34 all turn about the axis of the post 22. Throughout all these movements, the axis of the connection between the bars 23 and 24, on the one hand, and the member 20, on the other hand, remains on the same horizontal level, i.e. does not rise or fall. Thus the axis of the tool remains in the same horizontal plane all the time, namely the one which contains the axis of the block.

When the cut has been made in the block as described above, the block is turned by a small and known angle and a fresh shadow or photograph is optically projected onto the board 10, or a fresh photograph is physically placed upon the board and the procedure is repeated, the fresh shadow being produced, or the fresh photograph having been produced, after turning the object through the same small angle as that through which the block is turned. A series of shadows or photographs of the article to be copied are traced in this way, the block being turned every time a new one is to be traced. The block may, for example, be turned through 2° at a time, in which case a series of 180 shadows or photographs will be traced, these representing the shape of the profile of the article as seen from 180 different positions angularly spaced at 2° intervals. When this has been completed, the block will have been reduced to a shape similar to, but possibly larger or smaller than, the original article.

As indicated above, the apparatus described can be used when shadows of the article to be copied are projected onto the board 10. The apparatus can also be used in the case where a series of photographs of the article to be copied are physically placed upon the board. If, however, photographs are to be optically projected onto the board and then traced, additional means may conveniently be provided, as described below, for synchronising the rotational movement of the block with the introduction of the successive photographs for projection.

Referring to FIGURE 9, the driving mechanism 6 turns two long rods 43 and 44 in opposite directions about their respective axes. The rods extend to a film-projector 45 which is shown diagrammatically and which is disposed above the board 10. A film 46 is diagrammatically shown in the projector and it consists of a series of individual photographs of the original article, taken at regular intervals as the article was rotated at uniform speed about a central, vertical axis. Thus the photographs may be of a person sitting in a revolving chair. The film has the usual row of perforations extending along each side and sprockets 47 and 48 engage in these perforations. The sprockets are coupled to bevel gears 49 and 50 which mesh with bevel gears 51 and 52 fixed to the upper ends of the rods 43 and 44 respectively. Light rays pass through the film 46 and then proceed from the projector 45 to the board 10, as indicated in FIGURE 9, so that an image of the article, or person, is projected onto the board, as shown at 42 in FIGURE 8. If, for example, 180 photographs of the article or person were taken at regular intervals whilst it or he was being turned through 360°, then the driving mechanism 6 and the gearing at the projector will be so designed that when the block is turned through 2° the film 46 is advanced by an amount corresponding to one frame, i.e. by an amount equal to the pitch between successive pictures on the film.

When photographing the article or person, it is advantageous to suspend above it or him a thin vertical wire the axis of which coincides with the axis about which the article or person is turned. The wire will then appear on each picture as a thin line, which will extend transversely across the film. Thus a thin line will appear on the board 10. It will extend from left to right, considering the view shown in FIGURE 9. A reference line is marked on the board 10, also extending from left to right, considering FIGURE 9. It is shown at 53 in FIGURE 8. In using the apparatus, every time the block is turned forward by one step the driving mechanism is carefully operated to bring the line representing the wire into coincidence with the line 53. It is then in order to begin the cutting operation.

I claim:

1. Apparatus for use in making an article from a block of material, comprising a rotatably mounted support device for supporting a block of material such that the block and the support device may be turned about an axis of rotation, a long carriage adjacent the support device having one end nearer the support device than the other end, a tool holder rotatably mounted at said one end of the carriage for holding a rod-shaped tool directed towards said axis, means coupled to the tool holder for rotating the tool holder about its own axis, a fixed structure adjacent said other end of the carriage and a pivotal connection between the fixed structure and said other end of the carriage such that the pivot axis is movable along a straight path towards and away from said axis of rotation and this permits the tool holder to be moved adjacent the support device in all the directions which are such that the axis of the tool holder is always maintained in the same plane, which is a plane containing said rotational axis.

2. Apparatus according to claim 1 and further comprising a planar member for reception of an image of the article to be copied, a tracing device coupled to said tool holder whereby the tracing device can be used to trace the profile of an image on the planar member and the tool will move in unison with the tracing device along a path that corresponds to said profile, a film projector which is arranged to project images onto said planar member and is coupled to said support device such that when the support device and the block are turned through a predetermined small angle the film is stepped forward by an amount corresponding to one frame of the film.

3. Apparatus according to claim 2, wherein the coupling between the film-projector and said support device comprises a long rod which is coupled at one end to said support device so as to turn therewith and a sprocket coupled to the other end of the rod and engaging in perforations in the film.

4. Apparatus for use in making an article from a block of material, comprising a rotatably mounted support device for supporting a block of material such that the block and the support device may be turned about an axis of rotation, a long carriage adjacent the support device having one end nearer the support device than the other end, a tool holder rotatably mounted at said one end of the carriage for holding a rod-shaped tool directed towards said axis, means coupled to the tool holder for rotating the tool holder about its own axis; a fixed structure adjacent said other end of the carriage, portions of the fixed structure defining a slot therein extending towards and away from said axis of rotation and a projecting member extending from said other end of the carriage and into the slot to provide a pivotal connection between the fixed structure and said other end of the carriage such that the pivot axis is movable along the slot in a straight path towards and away from said axis of rotation and this permits the tool holder to be moved adjacent the support device in all the directions which are such that the axis of the tool holder is always maintained in the same plane, which is a plane containing said rotational axis.

5. Apparatus for use in making an article from a block of material, comprising a rotatably mounted support device for supporting a block of material such that the block and the support device may be turned about a horizontal axis of rotation, a long carriage extending horizontally adjacent the support device and having one end nearer the support device than the other end, a tool holder rotatably mounted at said one end of the carriage for holding a rod-shaped tool in a horizontal position directed towards said axis, means coupled to the tool holder for rotating the tool holder about its own axis, a fixed structure adjacent said other end of the carriage, two wheels mounted on said other end of the carriage to rotate about a horizontal axis and to roll upon said fixed structure and support the weight of said other end of the carriage, and a pivotal connection between the fixed structure and said other end of the carriage such that the pivot axis is vertical and is movable along a straight horizontal path towards and away from said axis of rotation and this permits the tool holder to be moved adjacent the support device in all the directions which are such that the axis of the tool holder is always maintained in the same horizontal plane, which is a plane containing said rotational axis.

6. Apparatus for use in making an article from a block of material, comprising a rotatably mounted support device for supporting a block of material such that the block and the support device may be turned about a horizontal axis of rotation, a long carriage extending horizontally adjacent the support device and having one end nearer the support device than the other end, a tool holder rotatably mounted at said one end of the carriage for holding a rod-shaped tool in a horizontal position directed towards said axis, means coupled to the tool holder for rotating the tool holder about its own axis, a fixed vertical post near said support device, a support structure mounted to swing about said post, a member which is pivotally connected to said support structure, this pivot axis being horizontal, and which is also pivotally connected to said one end of the carriage, this pivot axis being vertical, a fixed structure adjacent said other end of the carriage and a pivotal connection between the fixed structure and said other end of the carriage such that the pivot axis is vertical and is movable along a straight horizontal path towards and away from said axis of rotation and this permits the tool holder to be moved adjacent the support device in all the directions which are such that the axis of the tool holder is always maintained in the same horizontal plane, which is a plane containing said rotational axis.

7. Apparatus according to claim 6, wherein said support structure comprises a first bar which is inclined and has its upper end pivotally connected to said member, this pivotal connection constituting the afore-mentioned pivotal connection between said support structure and said member, and the support structure further comprises a rider which is mounted to ride up and down the post and to turn about it, a pivotal connection between the rider and the lower end of the first bar, a second inclined bar which is pivotally connected at its lower end to the middle of the first bar, an element which is mounted on the post to turn about it but to be immovable in the vertical direction, a pivotal connection between said element and the upper end of the second bar, the axes of these last three pivotal connections being horizontal, whereby when the carriage is moved towards and away from the axis of rotation of the support device the rider moves up and down the post and the inclinations of the bars change but the height above the ground of the pivotal connection between the first bar and said member remains unchanged and consequently the carriage does not rise and fall.

8. Apparatus according to claim 7 and further comprising wheels mounted on said element and running upon said post.

References Cited by the Examiner
UNITED STATES PATENTS

| 630,546 | 8/99 | Kruse | 90—13.1 |
| 1,618,804 | 2/27 | Bontempi | 90—13.1 |
| 2,311,943 | 2/43 | Holcomb | 90—13.2 |

WILLIAM W. DYER, JR., *Primary Examiner.*

LEON PEAR, *Examiner.*